(No Model.)

J. MATTHEWS.
PACKING DISPLACER.

No. 531,546. Patented Dec. 25, 1894.

WITNESSES:
Chas. Nida.
Theo. J. Hostn

INVENTOR
J. Matthews
BY
Munn & Co
ATTORNEYS.

UNITED STATES PATENT OFFICE.

JOSEPH MATTHEWS, OF NEW BEDFORD, MASSACHUSETTS.

PACKING-DISPLACER.

SPECIFICATION forming part of Letters Patent No. 531,546, dated December 25, 1894.

Application filed April 7, 1894. Serial No. 506,686. (No model.)

*To all whom it may concern:*

Be it known that I, JOSEPH MATTHEWS, of New Bedford, in the county of Bristol and State of Massachusetts, have invented a new and Improved Packing-Displacer, of which the following is a full, clear, and exact description.

The invention relates to packings contained in glands and abutting on a fixed sleeve supported in a bonnet.

The object of the invention is to provide a new and improved packing displacer, which is simple and durable in construction, and which is arranged to conveniently and easily displace the packing without the use of hooks and similar devices, to enable the operator to partly or wholly renew the packing.

The invention consists principally of a pushing device adapted to act on the packing, on moving the gland longitudinally, to push the packing out of the same.

The invention also consists of certain parts and details, and combinations of the same, as will be hereinafter described and claimed.

Reference is to be had to the accompanying drawings, forming a part of this specification, in which similar letters of reference indicate corresponding parts in both the figures.

Figure 1:
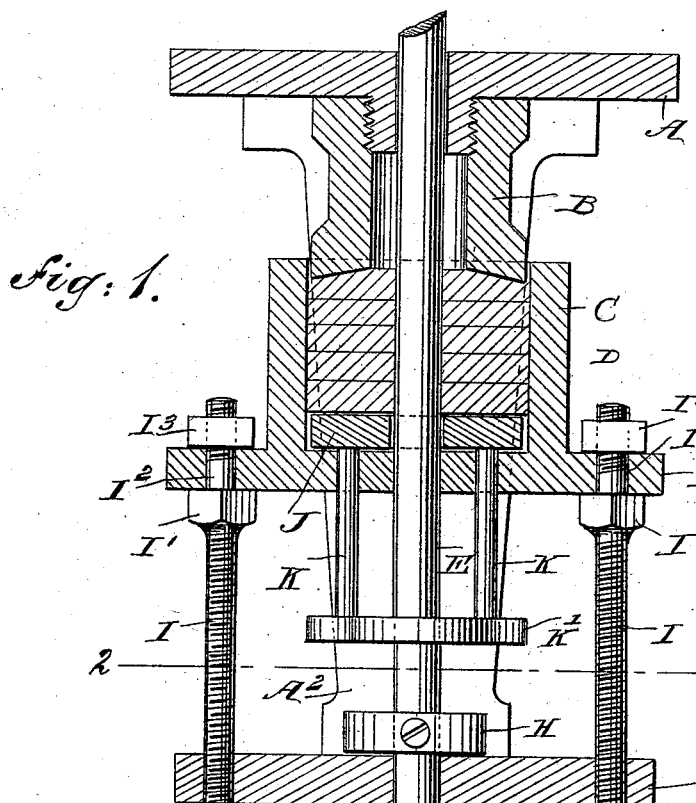
Figure 2:
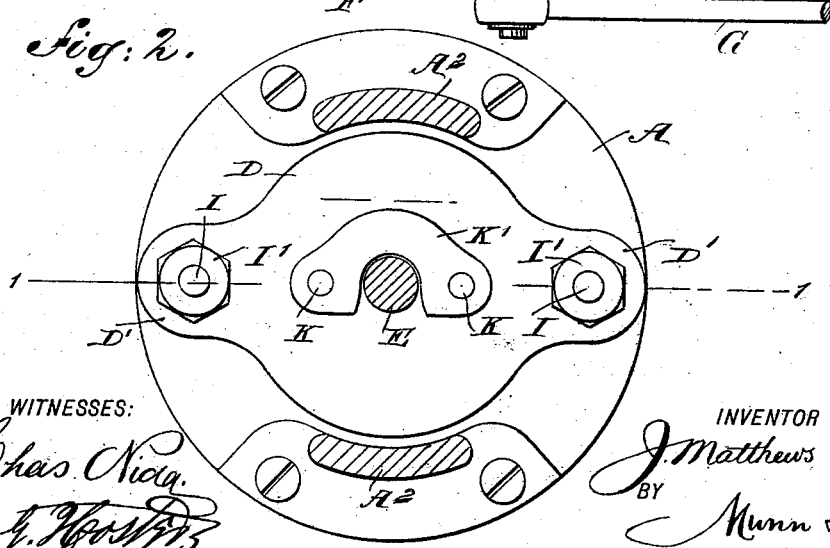

Figure 1 is a sectional plan view of the improvement on the line 1—1 of Fig. 2; and Fig. 2 is a sectional face view of the same on the line 2—2 of Fig. 1.

In stuffing boxes having a hollow gland for the reception of the packing and a sleeve secured on the bonnet and abutting on the packing contained in the said gland, as now used, for instance, on the valve stems of Corliss engines and other machinery, the operator, in order to partly or wholly renew the packing, must first move the gland containing the packing outward on the stem or rod, and then, by the use of a hook or other tool, must pull the packing out of the gland. This process is tedious, as but very little room is obtained between the inner end of the gland and the cylinder or chest, for the workman to properly manipulate the hook to pull the packing out of the gland, and besides, the packing is spoiled by the use of the hook.

With my device, presently to be described in detail, the packing is automatically and quickly pushed out of the gland on moving the latter outward, so that the operator can readily mend or renew the entire packing.

The bonnet A is fastened in the usual manner to the cylinder or chest, and supports a sleeve B abutting at its forward end on the packing C, contained in a hollow gland D through which passes centrally the stem or rod E, on which the packing C acts to form a steam tight joint.

The stem or rod E is provided at its outer end with the usual crank arm F, connected by the link G with the mechanism for imparting motion to the said rod or stem E, and the said outer end of the rod or stem E is journaled in a bearing A' supported by bars A$^2$ from the bonnet A. On the inner face of the said bearing A' abuts a collar H, secured by a set screw or other means on the stem E, so that the latter is prevented from longitudinal movement in either an outward or inward direction, by the collar H on the inner face of the bearing A', and by the crank arm F on the outer face thereof. The gland D is supported from this bearing A', and for this purpose the screw rods I, screw in the said bearing and are provided with heads I', abutting against the outer faces of lugs D' formed on the gland D, as will be readily understood by reference to the drawings. From the heads I' extend rearward the threaded portions I$^2$ engaging loosely the said lugs D', and on the extreme outer ends of the said portions I' screw the nuts I$^3$ abutting against the inner faces of the said lugs D'.

The pushing device for moving the packing C from the gland D is provided with a washer J, fitted into the bottom of the gland D, so as to engage the outermost packing face of the packing C, as is plainly shown in Fig. 1. This washer J is adapted to be engaged on its outer face by one, two or more pins K, extending parallel to the rod E and through apertures in the bottom or base of the gland D, the outer ends of the said pins being secured to a saddle K' held loosely on the top of the rod or stem and a short distance from the collar H. The pins K and the washer J form an abutment for the outer end of the packing to hold the latter stationary while the gland is moved outward, whereby the packing can be exposed to view.

When the several parts are in the position shown in Fig. 1, and it is desired to remove the packing C from the gland D for mending or for entirely renewing it, then the operator first loosens the nuts I³, and then, by means of a wrench or other suitable tool, engages the integral heads I' of the screw rods I, so as to screw the same outward in the bearing A'. In doing so the gland D is carried along by the screw rods I as they screw outward, and the pushing device is likewise carried outward by the gland, until finally the saddle K' abuts against the collar H, and then, on screwing the rods I outward farther, the pins K being now held stationary, hold the washer J in a like position and consequently the packing C, which is thus pushed out of the still forwardly moving gland D. As the packing C had previously been disengaged from the sleeve B on the first moving of the gland D, the operator has now the entire packing exposed to view, so that he can readily mend the same or entirely replace it by a new one, if deemed necessary. When this is done the rods I are again screwed up so as to move inward to move the gland D in a like direction, so that the several parts are returned to their normal position, shown in Fig. 1.

Thus, it will be seen that by the device described the packing is automatically pushed out of the gland on screwing up the rods I, and the packing is not damaged in any way by the use of hooks, as heretofore practiced.

I do not limit myself to the particular description of pushing device shown in the drawings and described above, as it is evident that other similar devices may be constructed for accomplishing the same result.

Having thus described my invention, I claim as new and desire to secure by Letters Patent—

1. A stuffing box provided with an abutment forming a seat for the inner end of the packing, a gland adapted to inclose the said packing and the said abutment, and another abutment projecting into the gland opposite the first-named abutment, to engage the outer end of the packing and hold the latter stationary while the gland is moved outward, substantially as described.

2. A gland comprising a base and a sleeve adapted to contain the packing, the sleeve being open at the end opposite to the base, and an abutment projecting through the base of the gland to engage the packing therein and hold it stationary while the gland is moved longitudinally with the base at its front end, substantially as described.

3. A gland adapted to contain a packing, a support for the gland, and a connection between the gland and its support permitting the former to be moved relatively to the latter, an abutment projecting into the gland to engage the packing, said abutment being movable relatively to the support, and adapted to collide with a stop limiting its motion, whereby the packing is allowed to move in unison with the gland until the said abutment collides with the stop, whereupon the packing will be held stationary during the further movement of the gland, as and for the purpose set forth.

4. A gland adapted to contain a packing, lugs rigidly secured to the tubular portion of the gland, a support for the gland, an adjustable connection between the said lugs and the gland support to permit of moving the gland relatively to its support, and an abutment projecting into the gland to hold the packing therein stationary while the gland is moved longitudinally, as and for the purpose set forth.

5. A packing displacer, comprising a washer held in the gland and abutting on the packing, and pins engaging the said washer and fitted to slide in apertures in the bottom of the said gland, substantially as shown and described.

6. A packing displacer, comprising a washer held in the gland and abutting on the packing, pins engaging the said washer and fitted to slide in apertures in the bottom of the said gland, and a saddle connecting the pins with each other at their outer ends, the said saddle being adapted to abut against a fixed stop, substantially as shown and described.

JOSEPH MATTHEWS.

Witnesses:
PETER J. McFADDEN,
ALEXANDER E. WILLIAMS.